United States Patent [19]

Langford, Jr.

[11] 4,256,351
[45] Mar. 17, 1981

[54] SEALING SYSTEM FOR A ROLLING CONE CUTTER EARTH BORING BIT

[75] Inventor: James W. Langford, Jr., Red Oak, Tex.

[73] Assignee: Dresser Industries, Inc., Dallas, Tex.

[21] Appl. No.: 963,630

[22] Filed: Nov. 24, 1978

[51] Int. Cl.² ............................................. F16C 33/72
[52] U.S. Cl. .................................... 308/8.2; 308/36.1
[58] Field of Search ...................... 308/8.2, 36.1, 36.5, 308/36; 175/371; 277/165, 92

[56] References Cited

U.S. PATENT DOCUMENTS

| 3,397,928 | 8/1968 | Galle | 308/8.2 |
|---|---|---|---|
| 3,601,417 | 8/1971 | Szepesvary | 277/165 |
| 4,134,596 | 1/1979 | Kawai et al. | 277/165 |
| 4,141,563 | 2/1979 | Wu | 277/165 |

Primary Examiner—Lenard A. Footland

Attorney, Agent, or Firm—Fred A. Winans; Eddie E. Scott

[57] ABSTRACT

A sealing system acts as a barrier to the drilling fluid, pulverized cuttings and other materials in the borehole preventing the materials from entering the bearing area of an earth boring bit and retains lubricant inside the bearing area. At least one bearing pin extends from the body of an earth boring bit and a rolling cone cutter is mounted on the bearing pin. A seal assembly is located in the mouth of the cutter between the cutter and the bearing pin. The seal assembly includes an annular rigid ring, an elastomeric ring and a deformable ring means mounted to rotate with said rolling cone cutter. The elastomeric ring is attached to the annular rigid ring. The elastomeric ring has a lip with a wiping surface that contacts the bearing pin. The deformable ring means is connected to the lip and maintains contact between the wiping surface and the bearing pin.

2 Claims, 3 Drawing Figures

SEALING SYSTEM FOR A ROLLING CONE CUTTER EARTH BORING BIT

FIELD OF THE INVENTION

The present invention relates to the art of earth boring and, more particularly, to a rotary rock bit with improved means for sealing the bearings of the bit from materials in the borehole and retaining lubricant within the bearing area. The present invention is especially adapted for use with rock bits popularly known as three-cone rotary rock bits; however, its use is not restricted thereto, and the present invention can be used in other types of rotary rock bits.

BACKGROUND OF THE INVENTION

A three-cone rotary rock bit consists of a main bit body adapted to be connected to a rotary drill string. The bit includes three individual rotatable cone cutters mounted on three individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant must be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A three-cone rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cone cutters. They have provided a longer useful lifetime for the cone cutters. This has resulted in the bearing systems of the bit being often the first and fail during the drilling operation. Consequently, a need exists for new and improved bearing systems to extend the useful lifetime of the bit and to allow development of other elements that interact with the sealing and bearing systems. In attempting to improve the bearing systems, various seal systems have been provided to maintain the bearing area free of harmful materials and retain lubricant. In attempting to provide new sealing systems, great care must be taken that the overall capacity of the bearing system is not reduced.

DESCRIPTION OF THE PRIOR ART

In U.S. Pat. No. 3,397,928 to E. M. Galle patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface thereon that opposes and engages the bearing surface on the shaft. A resilient packing ring is positioned in a groove in one of the surfaces. The packing ring, the groove and an opposing surface are sized such that upon assembly of the cutter element upon the shaft the cross-sectional thickness of the packing ring is compressed by not less than substantially 10% of this thickness prior to assembly of the cutter element upon the shaft.

Other drill bit bearings systems are shown in U.S. Pat. No. 1,884,965 to Baggett, U.S. Pat. No. 2,797,067 to Fisher, U.S. Pat. No. 3,075,781 to Atkinson, U.S. Pat. No. 3,096,835 to Neilson, U.S. Pat. No. 3,151,691 to Goodwin, U.S. Pat. No. 3,303,898 to Bercaru, U.S. Pat. No. 3,529,840 to Durham, U.S. Pat. No. 3,656,764 to Robinson and U.S. Pat. No. 3,862,762 to Millsap.

SUMMARY OF THE INVENTION

The present invention provides an improved sealing system for a rotary rock bit that acts as a barrier to the drilling fluid, pulverized cuttings and other materials in the borehole to prevent the materials from entering the bearing area of the bit and retains lubricant within said bearing area. A bit body is provided. At least one bearing pin extends from the bit body. A rolling cone cutter is rotatably mounted on the bearing pin. Bearing means are located between the rolling cone cutter and the bearing pin upon which it is mounted. The rolling cone cutter has a cutter mouth. A seal assembly is positioned around the bearing pin within the cutter mouth and located between the bearing pin and the rolling cone cutter. The seal assembly includes an annular rigid ring, an elastomeric ring and a deformable ring means mounted to rotate with the rolling cone cutter. The elastomeric ring is attached to the annular rigid ring. The elastomeric ring includes a lip with a wiping surface that contacts the bearing in. The deformable ring means is connected to the lip and maintains contact between the wiping surface and the bearing pin. The seal assembly provides better protection against foreign material intruding into the bearing area from the environment. The seal assembly allows the bit to be operated at higher operating speeds. The above and other features and advantages of the present invention will become apparent upon consideration of the following detailed description of the invention when taken in conjunction with the accompanying drawings.

DETAILED DESCRIPTION OF THE INVENTION

Figure 1:
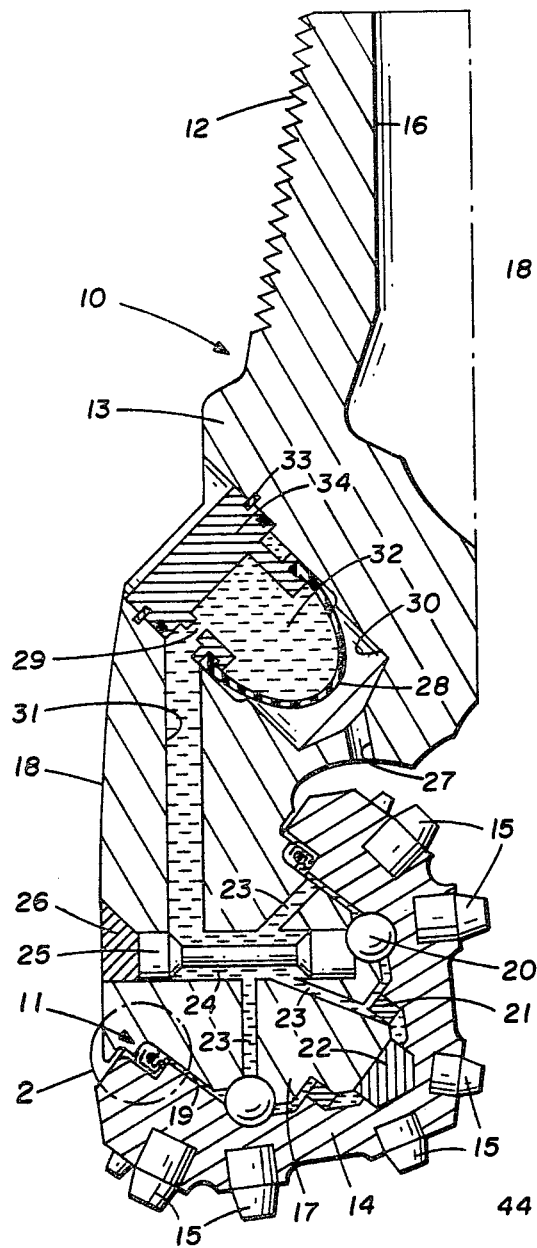
FIG. 1 is an illustration of an earth boring bit constructed in accordance with the present invention.

Referring now to FIG. 1, a sectional view of one arm 18 of a three-cone rotary rock bit 10 is shown. It is to be understood that the structure of the other two arms are substantially identical to the arm 18. A cutter 14 is rotatably positioned on the journal portion or bearing pin 17 of the arm 18 and adapted to disintegrate the earth formations as the bit 10 is rotated. The bearing pin 17 projects from the cutter receiving surface of the arm 18. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 14.

The body 13 of the bit 10 includes an upper threaded portion 12 that allows the bit 10 to be connected to the lower end of a rotary drill string (not shown). The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

a plurality of bearing systems are located in the bearing area between the cutter 14 and the bearing pin 17. The bearing systems in the bearing area include an outer friction bearing 19, a series of ball bearings 20, an inner friction bearing 21, and a thrust button 22. A seal assembly generally designated by the reference number 11 is positioned between the cutter 14 and the bearing pin 17. The seal assembly acts to retain lubricant in the bearing area around the bearing systems and prevent any materials in the well bore from entering the bearing area. The details of the seal assembly 11 will be explained subsequently. Passageways 23 and 24 are provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area. The additional passageways 23 extend from passageway 24 to the bearing area to insure a sufficient supply of lubricant to bearings 19, 20, 21 and 22.

A bore 30 extends into the body 13 from the surface of the bit body. A passage 31 extends from the bore 30 to the passageway 24. A lubricant reservoir 32 is located in the bore 30. The lubricant reservoir 32 is located between a flexible diaphragm 28 and a reservoir cap 34. An "O" ring seal prevents borehole fluid from by-passing the upper portion of the reservoir cap 34 and lubricant within the lubricant reservoir 32 from escaping into the borehole. A retaining ring 33 holds reservoir cap 34 in position in bore 30. The flexible diaphragm 28 prevents lubricant in the lubricant reservoir 32 from escaping into the bore 30 and fluid in the borehole that has entered bore 30 through passage 27 from entering the lubricant reservoir 32. Lubricant within the lubricant reservoir 32 is channeled into the passge 31 through opening 29 and is directed to the bearings.

Figure 2:
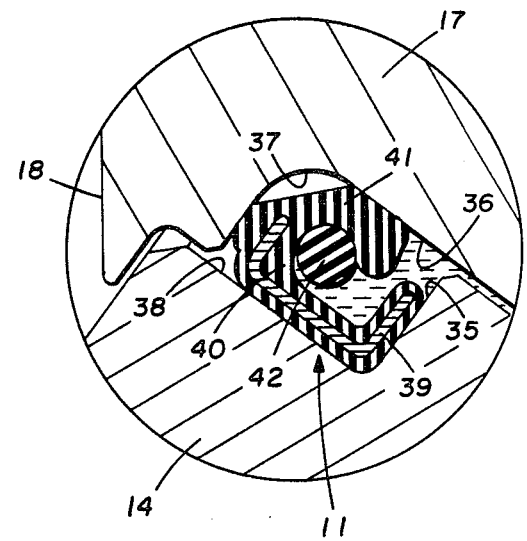
FIG. 2 is an enlarged view illustrating the seal assembly of the bit shown in FIG. 1.

Referring now to FIG. 2, an enlarged view of the seal assembly 11 is shown. The seal assembly 11 is positioned between a surface 36 on the bearing pin 17 and a surface 38 on the cone cutter 14. The seal assembly 11 is also positioned between the cutter surface 35 and the bearing pin surface 37. The seal assembly 11 includes a metal insert 39 or an insert of some other similarly rigid material. The insert 39 is bonded to or encased in an elastomer 40. The seal assembly 11 acts as a static seal due to the press-fit or interference fit compressing the elastomer 40 between the inside surface 38 of the cone cutter seal gland and the metal insert 39. The seal assembly 11 will therefore rotate with the rolling cone cutter 14. The seal assembly 11 will be able to operate at higher speeds without bunching or tearing because it is affixed to the rolling cutter with a "pressed in" or interference fit.

The seal assembly is protected from the borehole environment by a resilient wiping surface that operates on the machined surface of the bearing pin. Attached to the outer portion of the metal insert 39 is a protruding lip 41 of the elastomer 40 that will wipe along the surfaes 36 and 37 of the bearing pin 17. This will restrict foreign material from entering the bearing area. The sealing surface of lip 40 is held in contact with the bearing pin sealing surfaces 36 and 37 to provide a positive and dynamic seal by an elastomeric ring 42 or an annular ring of any material that exhibits the property of constricting. The ring 42 can be an integral part of the elastomer 40 or a separate member. The ring 42 is shown as an elastomer ring, however, it is to be understood that it could be made of other material such as a round metal spring. The difference in compression due to the loading on one side of the bearing pin 17 is compensated for by the elastomer ring 42 imparting a force on the sealing surface. Seal contact is provided with the bearing pin surface 37 and a static seal is formed at the surfaces 38 and 35.

The structural details of an earth boring bit 10 constructed in accordance with the present invention having been described, the operation of the bit 10 will now be considered with reference to FIGS. 1 and 2. The lubrication system of the bit 10 is filled with a suitable lubricant. The bit is rotated and thrust downward, thrusting the cutter 14 against the earth formations. Continued rotation with the drill string applying a thrust force to the bit 10 causes the cutters to disintegrate the formations and form the desired borehole. The present invention provides a seal assembly 11 in the cone mouth of the cutter 14 which will act as a barrier to the pulverized cuttings, the borehole fluid and any other materials in the borehole. The seal assembly 11 acts to prevent these materials from entering the bearing area through the cone mouth opening, thus providing an uncontaminated environment for the metal bearing elements and eliminating the abrasive wearing action of foreign materials in the bearing area. The lubricant is retained within the bit 10 by the seal assembly 11 to assure a long lifetime for the bearing systems. The seal assembly 11 provides improved protection against foreign material intruding into the bearing area from the abrasive borehole environment. The seal assembly 11 will also lend itself to higher operating speeds.

The prior art O-ring seal is effective as long as foreign, abrasive material does not come into contact with it and the rotary speed does not become excessive and bunch the O-ring up or tear it in some way. There is also a difference in compression imposed on the prior art O-ring from the loaded side of the bearing to the unloaded side. With the seal of the present invention, the sealing surface will be better protected from the environment by the resilient wiping surface that operates on the machined surface of the arm bearing. The seal of the present invention is able to operate at higher speeds without bunching or tearing because it is affixed to the cone surface with a "pressed in" or interference fit.

Figure 3:
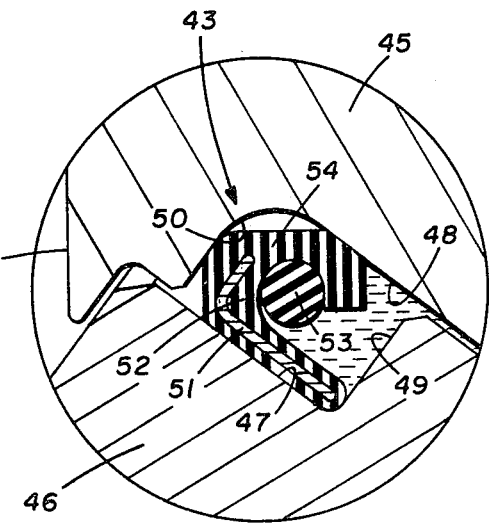
FIG. 3 illustrates another embodiment of a seal assembly.

Referring now to FIG. 3, a seal assembly 43 is shown illustrating another embodiment of the present invention. The seal assembly 43 acts to prevent materials in the borehole from entering the bearing area through the cone mouth opening of a rolling cone cutter 46, thus providing an uncontaminated environment for the metal bearing elements and eliminating the abrasive wearing action of foreign materials in the bearing area. The lubricant is retained within the bearing area by the seal assembly 43 to assure a long lifetime for the bearing systems. The seal assembly 43 provides better protection against foreign material intruding into the bearing area from the abrasive borehole environment. The seal assembly 43 will lend itself to higher operating speeds. The seal assembly 43 is positioned between a surface 48 on the bearing pin 45 and a surface 47 on the cone cutter 46. The seal assembly 43 is also positioned between the cutter surface 49 and the bearing pin surface 50. The seal assembly 43 includes a metal insert 51 or an insert of some other similarly rigid material. The insert 51 is bonded to or encased in an elastomer 52. The seal assembly 43 acts as a static seal due to the press-fit or interference fit compressing the elastomer 52 between the inside surface 47 of the cone cutter and the metal insert 51. The seal assembly 43 will therefore rotate with the rolling cone cutter 46. The seal assembly 43 will be able to operate at higher speeds without bunching or tearing because it is affixed to the rolling cutter 46 with a "pressed in" or interference fit.

The seal assembly 43 is protected from the borehole environment by a resilient wiping surface that operates on the machined surface of the bearing pin 45. Attached to the outer portion of the metal insert 51 is a protruding lip 54 of the elastomer 52 that will wipe along the surfaces 48 and 50 of the bearing pin. This will restrict foreign material from entering the bearing area. The sealing surface of lip 54 is held in contact with the bearing pin sealing surfaces 48 and 50 to provide a positive and dynamic seal by an elastomeric ring 53 or an annular ring of any material that exhibits the property of constricting. The ring 53 can be an integral part of the elastomer 52 or a separate member. The ring 53 is shown as an elastomer ring; however, it is to be understood that it could be made of other materials such as a round metal spring. The difference in compression due to the loading on one side of the bearing pin 46 is conpensated for by the elastic ring 53 imparting a force on the sealing surface.

The embodiments of the invention in which an exclusive property or privilege is claimed are defined as follows:

1. An earth boring bit for operation in an abrasive borehole environment, comprising:
   a bit body;
   at least one bearing pin extending from said bit body;
   a rolling cone cutter mounted to rotate about said bearing pin, said rolling cone cutter having an open cone mouth;
   a lubricant maintained between said bearing pin and said rolling cone cutter;
   an annular rigid ring located between said bearing pin and said rolling cone cutter with an elastomer connected to said annular rigid ring, said annular rigid ring with an elastomer being located in said open cone mouth and affixed to said rolling cone cutter by an interference fit so that said annular rigid ring will rotate with said rolling cone cutter;
   an elastomer sealing ring attached to said annular rigid ring, said elastomer sealing ring having a protruding lip with a wiping surface that extends toward said bearing pin and contacts said bearing pin thereby sealing said lubricant from said abrasive borehole environment; and
   an elastomeric constricting ring positioned around said protruding lip that maintains said wiping surface of said elastomeric sealing ring in contact with said bearing pin.

2. An earth boring bit for drilling in an abrasive borehole environment, comprising:
   a bit body;
   at least one bearing pin extending from said bit body;
   a rolling cone cutter mounted to rotate about said bearing pin, said rolling cone cutter having an open cone mouth;
   a lubricant between said bearing pin and said rolling cone cutter;
   an annular rigid ring located in said open cone mouth between said bearing pin and rolling cone cutter;
   an elastomer connected to said annular rigid ring and located between said annular rigid ring and said open cone mouth, said open cone mouth and said annular rigid ring being of sizes that produce an interference fit between said open cone mouth, said elastomer and said annular rigid ring and provide a static seal, said annular rigid ring and elastomer thereby adapted to rotate with said rolling cone cutter;
   an elastomeric sealing ring attached to said annular rigid ring, said elastomeric sealing ring having a protruding lip with a wiping surface that extends toward said bearing pin and contacts said bearing pin thereby sealing said lubricant from said abrasive borehole environment; and
   an elastomeric constricting ring positioned around said protruding lip that maintains said wiping surface of said elastomeric sealing ring in contact with said bearing pin.

* * * * *